Jan. 8, 1946.   H. C. LIKEL   2,392,396
PEAK VOLTAGE INDICATOR AND REGULATOR
Filed Oct. 16, 1943   3 Sheets-Sheet 1

INVENTOR.
Harry C. Likel
BY
Darby + Darby

Jan. 8, 1946. H. C. LIKEL 2,392,396
PEAK VOLTAGE INDICATOR AND REGULATOR
Filed Oct. 16, 1943 3 Sheets-Sheet 2

INVENTOR.
Harry C. Likel
BY Darby & Darby

Patented Jan. 8, 1946

2,392,396

UNITED STATES PATENT OFFICE 2,392,396

PEAK VOLTAGE INDICATOR AND REGULATOR

Harry Charles Likel, Brooklyn, N. Y., assignor to Postal Telegraph-Cable Company (New York), New York, N. Y., a corporation of New York Application October 16, 1943, Serial No. 506,500

11 Claims. (Cl. 178—69)

The present invention relates to an indicator for showing which of several peak voltages is the highest, second highest, third highest, etc., and also comprehends the application of the indicator as a means for regulating the artificial line resistance of a duplex telegraph circuit both manually and automatically.

In the following description the indicator is shown as applied to a duplex telegraph circuit although it may be utilized to indicate the relationship between peak voltages in other circuits. For example, the indicator may be utilized for indicating the peak voltage relationships between the phases of a polyphase system or for determining the value and order in which peak voltages occur between the cathodes and the anodes of a multiphase rectifier.

As regards the indication of peak voltages in the line and artificial line legs of a duplex telegraph system, the application is to the method, disclosed in copending application of Alder F. Connery, Serial No. 494,172, filed July 10, 1943, for "Duplex balance indicator." In general this method depends upon the voltage relationships occurring between an arbitrarily selected point on a resistance in the real line leg of a duplex circuit and two points on a resistance in the artificial line leg, the latter two points being so selected that the maximum voltages occurring between each one of these points and the point in the real line will, when the system is in balance, be equal.

It is an object of my invention to provide a peak voltage indicator which will show the relationship between voltages occurring in two or more related branches of a circuit.

It is another object of my invention to provide a peak voltage indicator which will show the relationship between peak voltages occurring in separate circuits.

It is a further object of my invention to provide an automatic regulator operated by a peak voltage detector, this regulator being adapted to alter the constants in one of two circuits to make the peak voltages occurring in the two circuits equal.

It is a still further object of my invention to provide such a regulator as that mentioned above particularly adapted to automatically regulate the artificial line resistance of a duplex telegraph circuit.

Figure 1:
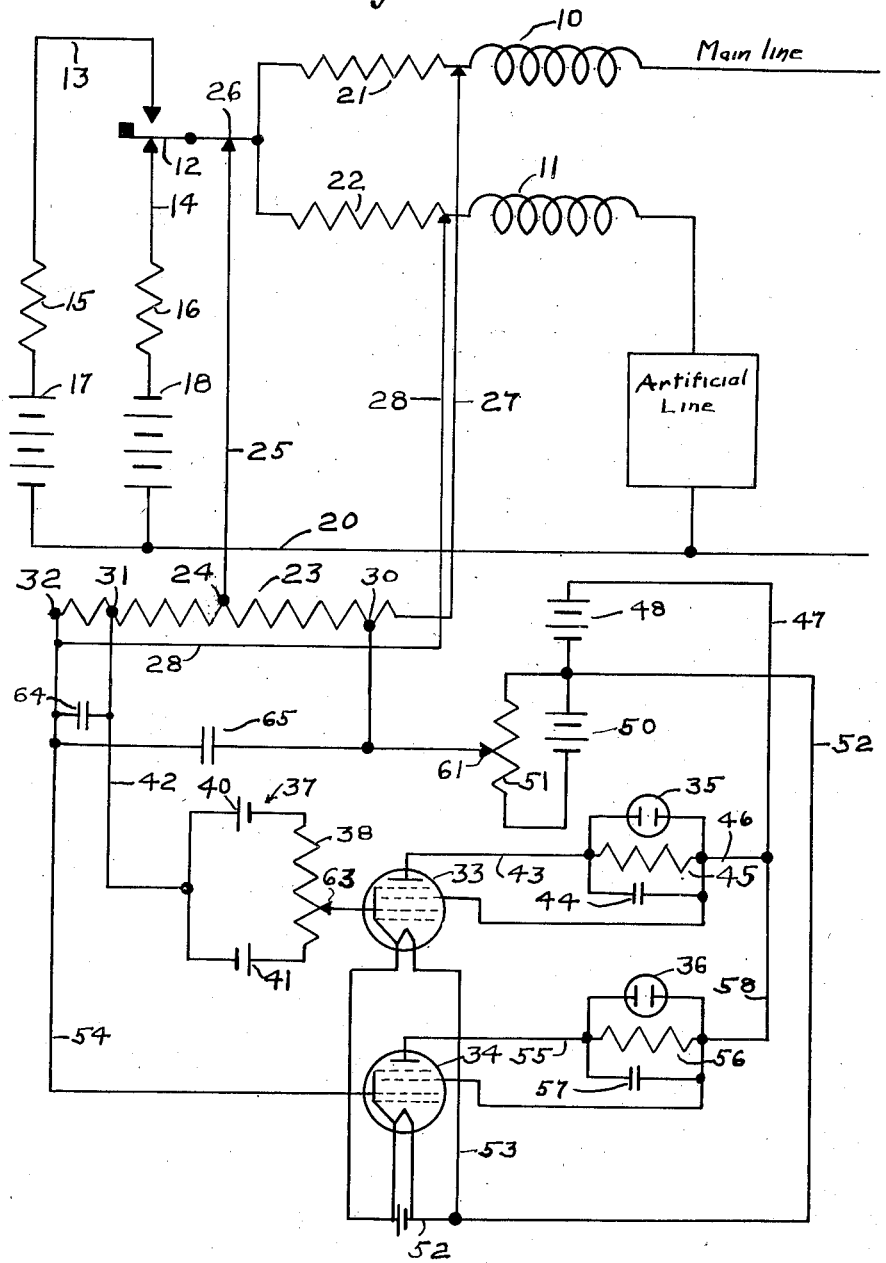
Figure 2:
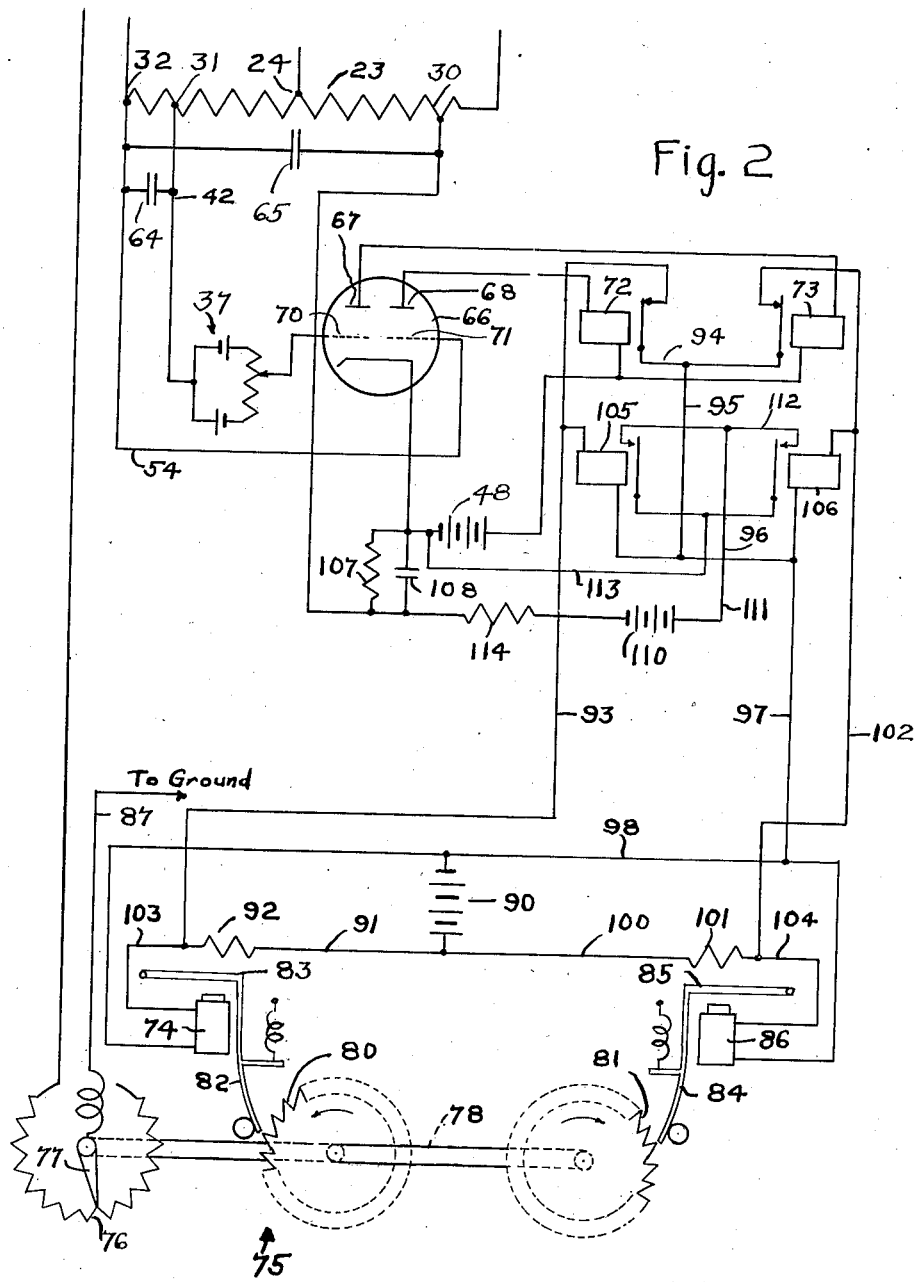
Figure 3:
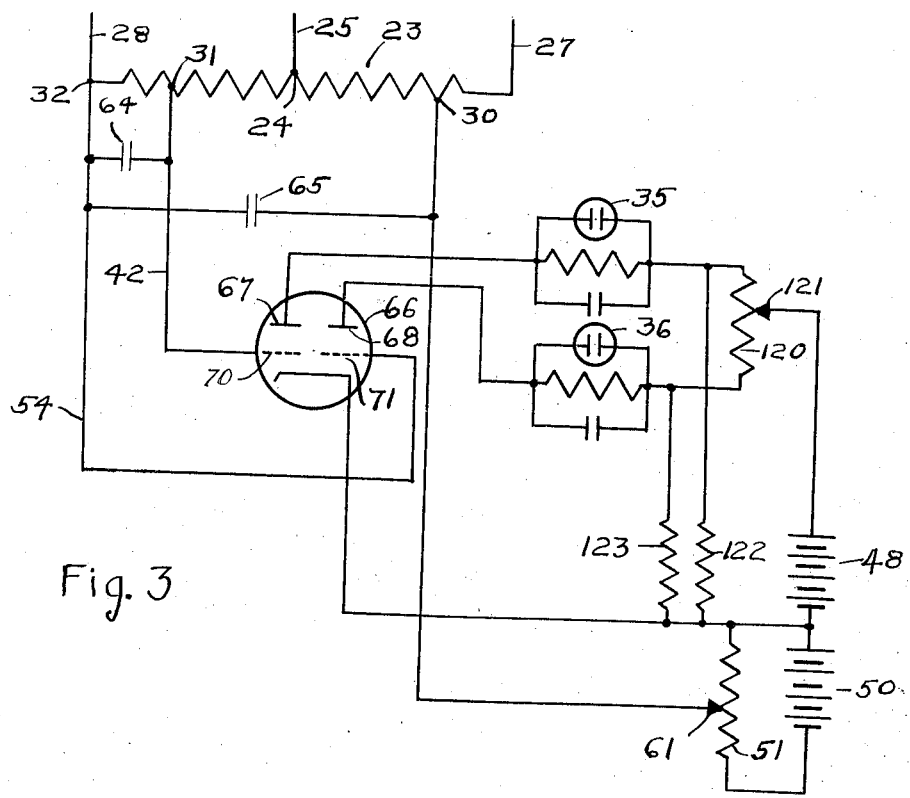

Further objects and features of my invention will appear when the following description is considered in connection with the annexed drawings, in which Figure 1 is a schematic diagram of a peak voltage indicator applied for line balancing according to the method of copending application of Alder F. Connery, Serial No. 494,172, showing the connections thereof to one terminal of a duplex telegraph circuit;

Figure 2 is a schematic diagram of one form of automatic regulator for adjusting the artificial line resistance of a duplex telegraph circuit in accordance with the peak voltages occurring in the circuit; and Figure 3 is a schematic diagram of an alternative circuit for balancing the two vacuum tubes for the two circuits of the duo-triode of Figures 1 and 2.

Referring now to Figure 1, there is shown in the upper part of that figure the telegraph equipment for one terminal of a duplex telegraph circuit. In the drawings 10 and 11 represent the windings of the differential relay of a differential type duplex or the bridge arms of a bridge type duplex set. As is customary, one of these windings or bridge arms, as the case may be, as 10, is connected to the real line and the other, 11, to the artificial line. Also as is usual, the opposite terminals of the two relay windings or bridge arms are connected together and to the transmitting key 12 (this may, of course, be the tongue of a transmitting relay). The key 12 is connected by means of conductors 13 and 14 to limiting resistance 15 and 16 and thence to the batteries 17 and 18 which are oppositely poled as is customary. Batteries 17 and 18 are connected to ground or to a metallic return 20, this also being in accordance with usual practice. In this instance, resistances 21 and 22 are put in series with the windings or arms 10 and 11 respectively in order to lessen the effects of the mutual inductance between the windings 10 and 11 on the peak voltage indicator, and to increase the resistance of the legs of the circuit across which the indicator is connected.

The voltage divider 23 is center tapped at 24 and connected by means of conductor 25 to the split of the duplex at 26. The ends of the divider are connected by means of conductors 27 and 28 to the two legs of the duplex. Divider 23 is also tapped at points 30 and 31, point 31 being electrically twice as far removed from the left end of the divider, as shown in Figure 1, as is point 30 from the right end. As is explained in detail in the Connery application above mentioned, when the artificial line is in proper balance, the peak voltages occurring between points 30 and 31 and points 30 and 32 will be equal.

The indicator of the present invention is shown in the lower part of Figure 1, and comprises the two vacuum tubes 33 and 34 together with the glow tubes 35 and 36 and their associated circuits. The control grid of vacuum tube 33 is connected by means of potentiometer circuit 37 (comprising the potentiometer 38 and batteries 40 and 41) and conductor 42 with the point 31 on the voltage divider 23. The plate of tube 33 is connected by means of conductor 43 to a load circuit comprising condenser 44, resistance 45 and glow tube 35. This load circuit is in turn connected by means of conductors 46 and 47 to the plate supply battery 48.

The grid-cathode circuit of tube 33 is supplied with its operating potential by battery 50, potentiometer 51, the voltage between points 30 and 31, and potentiometer circuit 37.

In a similar manner, the grid of vacuum tube 34 is connected by means of conductor 54 to point 32 of the potentiometer and the plate of this tube is connected by means of conductor 55 to the load circuit comprising glow lamp 36, resistance 56 an condenser 57. The load circuit is in turn connected by means of conductors 58 and 47 to the plate battery 48. The cathode of tube 34 is connected by means of conductor 52 to the battery 50 and potentiometer 51 being exactly similar in this respect to the corresponding circuit of tube 33.

The voltage in the grid-cathode circuit of vacuum tube 34 is the bias voltage supplied by potentiomter 51 (in accordance with the adjustment of contact 61 thereon) plus the voltage occurring between points 30 and 32.

Hereinafter the voltage supplied by potentiometer 51 will be designated at $E_c$ and that supplied by potentiometer 37 as $E_b$.

If now the potentiometer 51 is adjusted so that the total voltages in the grid circuits of tubes 33 and 34 are beyond the cut off point when the voltage divider 23 is not connected to the telegraph circuit, then upon connecting the divider to the telegraph circuit if a voltage is developed by the incoming signal across voltage divider 23 with its positive polarity toward point 32 and the transmitting relay tongue or the transmitting key 12 is on the positive contact, the voltage appearing between points 30 and 31 will be at its maximum value with positive toward the grid of vacuum tube 33.

If the incoming signal remains the same but the transmitting key 12 is moved into contact with the negative battery the voltage appearing between points 30 and 32 of voltage divider 23 will be at its maximum value with positive toward the grid of tube 34. If now the voltage $E_c$ is slowly reduced in magnitude making the grids of the two tubes 33 and 34 less negative, either the grid of tube 33 or that of tube 34 or both will be driven into the conducting region in turn as the voltage conditions discussed above and in greater detail in the Connery application above mentioned come about through the operation of the telegraph circuit. As etiher tube conducts the voltage across its load circuit comprising glow lamp 35, resistance 45 and condenser 44 in one case and glow lamp 36, resistance 56 and condenser 57 in the other, will rise until the particular glow lamp flashes. Since the voltage $E_b$ is so adjusted that with no voltage existing across the main and artificial lines both glow lamps would light at the same setting of the potentiometer 51, it will be clear that as $E_c$ is slowly reduced, lamp 35 will flash before lamp 36 if the resistance of the artificial line is too high. Conversely lamp 36 will flash first if the resistance of the artificial line is too slow. Moreover if the resistance of the artificial line is correct for balance, lamps 35 and 36 will flash in an irregular alternate manner depending upon the combinations of the received and transmitted signals.

The load condensers 44 and 57 serve two purposes. They prevent a too rapid build up of voltage across the respective load resistances 45 and 56 and the lamp 35 and 36 in response to spurious voltages of short duration in the grid circuits of tubes 33 and 34 and, furthermore, they provide reservoirs of current to assure a bright flash of the associated glow lamps when they ionize.

As shown in Figure 1, there are two additional condensers 64 and 65 which are connected across points 31 and 32 and 30 and 32 of the voltage divider 23 respectively. These two condensers are for the purpose of reducing the voltages developed between points 31 and 30 and 30 and 32 during transient conditions such as those caused by static unbalance or noise conditions.

As was indicated above the procedure in using my device is as follows. First the measuring circuits for the low and high sides must be balanced. To effect this the tubes 33 and 34 are switched on and with no connections to the telegraph circuit the bias voltage $E_c$ is made less negative by adjustment of contact 61 on potentiometer 51 until either lamp 35 or 36 ignites. If lamp 35 ignites the voltage $E_b$ is made more negative while if lamp 36 ignites this voltage is made more positive. Contact 61 is then again adjusted until the voltage supplied by potentiometer 51 is sufficiently negative to cause the extinguishment of the lighted lamp. This procedure is repeated until upon reducing $E_c$ both lamps simultaneously ignite. When this occurs the circuits are balanced and ready for use.

The connections of the leads 25, 27 and 28 to the telegraph circuit, as shown in Figure 1, are next made. The unit is now ready for use in balancing the telegraph circuit. Contact 61 is at this time adjusted to make the biasing voltage $E_c$ a maximum and prevent either of the lamps 35 or 36 from lighting. Next $E_c$ is slowly reduced by adjustment of contact 61 until one or both of the lamps begin to flash. If the artificial line resistance is set at too low a value lamp 36 will flash, this lamp, of course, being suitably marked to indicate that its ignition represents a condition of the circuit in which the artificial line resistance is too low. Thereupon the artificial line resistance is increased in value by some suitable amount, say 50 ohms. If this causes the lamp 36 to stop flashing and the lamp 35 to begin to flash it indicates that the proper value of artificial line resistance is somewhere between the old and new values. The resistance is so set and checked by repeating the adjustment of the contact 61 to show that both lamps now flash.

In some instances, it is preferable to adjust the artificial line resistance automatically rather than to merely indicate that such adjustment should be made. In Figure 2, there is shown an arrangement for accomplishing such automatic adjustment. In this figure the voltage divider 23 is identical with that of Figure 1 and is connected to the telegraph circuit in exactly the same manner. Furthermore, in this figure the two pentode tubes 33 and 34 of Figure 1 have been replaced with a duo-triode 66, having two plates 67 and 68 and two grids 70 and 71. It will, therefore, be clear that in effect this duo-triode 66 is the equivalent of the two tubes 33 and 34.

The grids 70 and 71 of the tube are connected to points 31 and 32 of the voltage divider 23 by means of leads 42 and 54 in a manner exactly similar to the connection of the grids of the pentodes of Figure 1 to the voltage divider 23. In place of the output or load circuits comprising the lamps 35 and 36, resistance 46 and 56 and condensers 44 and 57, there are supplied two breakover relays 72 and 73, the windings of which are respectively connected to the plates 68 and 67 of the duo-triode 66. Upon operation of either of these relays and considering relay 72 as an example, it will be seen that a short circuit is removed from the associated magnet 74 of an artificial line resistance adjusting device generally designated 75.

The resistance adjusting device 75 comprises a rheostat 76 having a rotatable contact 77 mounted upon a shaft 78 upon which are also mounted for rotation therewith the two ratchet wheels 80 and 81. Cooperating with the ratchet wheel 80 is a resilient pawl 82 made integral with the armature 83 of the magnet 74. In like manner, a resilient pawl 84 integral with armature 85 of magnet 86 cooperates with the ratchet wheel 81. The rheostat 76 is substituted for the normal adjustable artificial line resistance and is connected through the movable contact 77 to ground or to the return line by means of conductor 87, the rheostat 76 being connected at its other terminus to the artificial line end of the duplex differential relay or duplex bridge arm such as 11 of Figure 1.

It will be clear that when magnet 74 is operated, the artificial line resistance is increased and when magnet 86 is operated the resistance is decreased. As was indicated above, magnet 74 is operated upon the operation of break over relay 72. However, the circuit for operating this magnet was not traced in detail above but will be in the following. Normally both magnets 74 and 86 are short circuited by virtue of the normally closed position of the contacts of relays 72 and 73. When relay 72 is in its normal position a circuit is completed from the battery 90 over conductor 91, resistance 92, conductor 93 to the contact and tongue of relay 72 to conductor 94 and thence over conductors 95, 96, 97 and 98 to the opposite side of the battery. In a like manner, when relay 73 is in its normal position a circuit is completed from battery 90, conductor 100, resistance 101, conductor 102, contact and tongue of relay 73 to conductor 94 and thence over the path just above traced in connection with relay 72 to the opposite side of battery 90. Upon operation of relay 72 the circuit above traced for it is broken at its tongue and contact and the short circuit removed from magnet 74, the operating circuit for this magnet then extending from resistance 92 through conductor 103 to the magnet and thence over conductor 98 to the opposite side of the battery 90. In the identical manner the operation of relay 73 removes the short circuit from the magnet 86 and permits its energization over a circuit extending from resistance 101 through conductor 104 and the magnet winding to conductor 98 and the opposite side of battery 90. It will be obvious from the description of Figure 1 that when the artificial line resistance is too high it causes energization of breakover relay 73 which in turn causes operation of magnet 86 and clockwise rotation of shaft 78, thereby lowering the artificial line resistance. Conversely when the artificial line resistance is too low breakover relay 72 is energized to in turn energize magnet 74 and increase the artificial line resistance.

Due to the fact that a change in the line balance is usually if not invariably accompanied by a change in the voltage level on the line, the voltage $E_c$ which was previously (in the circuit of Figure 1) manually adjusted, must now be automatically adjusted if the circuit is to operate without supervision. For this purpose, two relays 105 and 106 are provided, these relays being respectively operated by the operation of break over relays 72 and 73. Relays 105 and 106 are adapted to place bias upon the grids 70 and 71 of the duo-triode 66. Considering now relay 105 it will be seen that this relay is operated at the time when the short circuit is removed from magnet 74 as above described, the winding of relay 105 being in parallel with the winding of magnet 74. Likewise relay 106 is operated when break over relay 73 operates, its winding being in parallel with the winding of magnet 86 and the short circuit being removed from its winding at the time of operation of relay 73. Upon operation of relay 105 a circuit is completed from biasing battery 110 through conductors 111 and 112, closed contact and tongue of relay 105, conductor 113, resistance 107 and condenser 108 in parallel, and resistance 114 to the other pole of battery 110. Essentially the same circuit is completed upon the operation of relay 106. The closure of the circuit just above traced raises the bias voltage $E_c$ which decreases as the charge on condenser 108 is dissipated. Thus, as the line level changes, the bias voltage $E_c$ is caused to be raised and lowered through a range in the same manner as manual adjustment was made in connection with the circuit of Figure 1. Under suitable line conditions, first one break over relay will operate and then the other, causing the artificial line resistance to hunt by the amount represented by one tooth of the ratchet wheels 80 and 81.

In some instances it is preferable to equalize the output of the two tubes 33 and 34 or to equalize the output of the two plate circuits 67 and 68 of the duo-triode 66 by adjusting their plate potentials rather by the adjustment of the grid voltage. In this case the potentiometer 37 of Figures 1 and 2 is omitted and a potentiometer 120, Figure 3, is provided in the plate circuits of the two tubes. It will be seen that by adjusting the contact 121 on the potentiometer 120 and the voltage applied to the plates 67 and 68 of the duo-triode 66, the output of these tubes may be made equal so that the indicators in the load circuit, whether these indicators be the glow lamps 35 and 36 as shown in Figure 3 or the break over relays 72 and 73 of Figure 2, will ignite under the same peak voltage conditions in the circuits under test. When such a potentiometer 120 is used it is preferable to utilize resistances 122 and 123 across the battery 48 in order that current may be flowing at all times in the potentiometer and in order that the potentiometer resistance may be less than would otherwise be necessary. These two bleeding resistances 122 and 123 should be of equal value.

As was indicated above, and as will be obvious to those skilled in the art, the potentiometer 120 may be utilized as an equalizing circuit in connection with the automatic regulator of Figure 2, as well as in connection with the indicator of Figure 1. As will also be obvious, either the duo-triode of Figures 2 and 3, or the two tube arrangement of Figure 1 is susceptible to this mode of adjusting the output to cause operation of the glow lamps or break over relays under the same voltage conditions of the two circuits under test. It will be understood, however, that if the two tube arrangements is used the tubes must be triode tubes since with pentode tubes the plate voltage change will not be effective.

While I have described preferable embodiments of my invention it will be understood that many additional modifications are possible. Moreover, it will be clear that instead of indicating the peak voltages in circuits having a common leg, it is entirely possible by mechanically interconnecting potentiometers such as 51 of Figures 1 and 3, to indicate the relative value of peak voltages occurring in entirely separate circuits. Again the comparison need not be between two circuits only, but may be extended by the addition of vacuum tubes and indicators to as many circuits as may be desirable. It will, of course, be understood that in this instance all tubes except one would be supplied with a potentiometer circuit such as 37 of Figure 1, or the equivalent thereof shown in Figure 3, in order that the vacuum tubes might be adjusted to operate under the identical peak load conditions. Consequently the scope of my invention is to be determined not by the foregoing description, but solely by the annexed claims.

What is claimed is:

1. In a device for indicating the comparative magnitude of the peak voltages developed in a plurality of circuits, in combination, a plurality of electron tubes corresponding in number to the number of circuits, each tube having an input circuit and an output circuit, an indicating means in the output circuit of each tube, said indicating means requiring a minimum voltage to operate, means for adjusting the output of said tubes relatively to each other to render the associated indicating means all operable upon the occurrence of a particular voltage in the input circuits, means for connecting the said input circuits to the circuits to be tested thereby applying voltages in proportion to those developed in the test circuits to said tube input circuits, and means for simultaneously varying the outputs of all said tubes over a range including the output resulting from the occurrence of said particular voltage in the input circuit whereby said indicating means are caused to operate in sequence in accordance with the magnitudes of the maximum voltages developed in the associated circuits.

2. In a device for indicating the comparative magnitude of the peak voltages developed in a plurality of circuits, in combination, a plurality of electron tubes corresponding in number to the number of circuits, each tube having an input circuit and an output circuit, an indicating means in the output circuit of each tube, said indicating means requiring a minimum voltage to operate, means for adjusting the output of said tubes relatively to each other to render the associated indicating means all operable upon the occurrence of a particular voltage in the input circuits, said adjusting means comprising potentiometers in the input circuits of all said tubes save one, means for connecting the said input circuits to the circuits to be tested thereby applying voltages in proportion to those developed in the test circuits to said tube input circuits, and means for simultaneously varying the outputs of all said tubes over a range including the output resulting from the occurrence of said particular voltage in the input circuit whereby said indicating means are caused to operate in sequence in accordance with the magnitudes of the maximum voltages developed in the associated circuits.

3. In a device for indicating the comparative magnitude of the peak voltages developed in a plurality of circuits, in combination, a plurality of electron tubes corresponding in number to the number of circuits, each tube having an input circuit and an output circuit, an indicating means in the output circuit of each tube, said indicating means requiring a minimum voltage to operate, means for adjusting the output of said tubes relatively to each other to render the associated indicating means all operable upon the occurrence of a particular voltage in the input circuits, said adjusting means comprising potentiometers in the input circuits of all said tubes save one, means for connecting the said input circuits to the circuits to be tested thereby applying voltages in proportion to those developed in the test circuits to said tube input circuits, and means comprising a potentiometer common to the input circuits of all said tubes for simultaneously varying the outputs of all said tubes over a range including the output resulting from the occurrence of said particular voltage in the input circuit whereby said indicating means are caused to operate in sequence in accordance with the magnitudes of the maximum voltages developed in the associated circuits.

4. In a device for indicating the comparative magnitude of the peak voltages developed in a plurality of circuits, in combination, a plurality of electron tubes corresponding in number to the number of circuits, each tube having an input circuit and an output circuit, an indicating means in the output circuit of each tube, said indicating means requiring a minimum voltage to operate, means for adjusting the output of said tubes relatively to each other to render the associated indicating means all operable upon the occurrence of a particular voltage in the input circuits, said means comprising a potentiometer in the output circuit of all said electron tubes save one, means for connecting the said input circuits to the circuits to be tested thereby applying voltages in proportion to those developed in the test circuits to said tube input circuits, and means for simultaneously varying the outputs of all said tubes over a range including the output resulting from the occurrence of said particular voltage in the input circuit whereby said indicating means are caused to operate in sequence in accordance with the magnitude of the maximum voltages developed in the associated circuits.

5. In a device for indicating the comparative magnitude of the peak voltages developed in a plurality of circuits, in combination, a plurality of electron tubes corresponding in number to the number of circuits, each tube having an input circuit and an output circuit, an indicating means in the output circuit of each tube, said indicating means requiring a minimum voltage to operate, means for adjusting the output of said tubes relatively to each other to render the associated indicating means all operable upon the occurrence of a particular voltage in the input circuits, said means comprising a potentiometer in the output circuit of all said electron tubes save one, means for connecting the said input circuits to the circuits to be tested thereby applying voltages in proportion to those developed in the test circuits to said tube input circuits, and means comprising a potentiometer common to the input circuits of all said tubes for simultaneously varying the outputs of all said tubes over a range including the output resulting from the occurrence of said particular voltage in the input circuit whereby said indicating means are caused to operate in sequence in accordance with the magnitudes of the maximum voltages developed in the associated circuits.

6. In a device for indicating the comparative magnitudes of peak voltages derived from the real and artificial line circuits of a duplex telegraph circuit and thereby indicating the condition of balance between the said real and artificial lines, in combination, a voltage divider having a center tap and adapted to have said center tap connected to the split of the duplex and its ends connected one to the real line and one to the artificial line of the duplex, said voltage divider having two additional taps, the first one of which is located a predetermined electrical distance from the main line connection to the divider, and the second one of which is located twice that electrical distance from the artificial line end of the voltage divider, a pair of electron tubes each having an input circuit and an output circuit, the input circuit of one of said tubes including that portion of the voltage divider between said first and said second mentioned taps, the input circuit of the second electron tube including that portion of the voltage divider between the first mentioned tap and the artificial line end of the voltage divider, indicating means in the output circuit of each of said electron tubes, said means being operable only upon the application thereto of a certain minimum voltage, means to adjust the output of one of said tubes to cause both said indicating means to function upon the application of a particular voltage to the corresponding electron tube input circuit, means to connect said voltage divider to said duplex circuit, and means to simultaneously adjust the outputs of said tubes over a range including the pre-set operating point for said indicating means whereby said indicators are caused one to operate when the artificial line resistance is too low and the other to operate when the artificial line resistance is too high.

7. In a device for indicating the comparative magnitudes of peak voltages derived from the real and artificial line circuits of a duplex telegraph circuit and thereby indicating the condition of balance between the said real and artificial lines, in combination a voltage divider having a center tap and adapted to have said center tap connected to the split of the duplex and its ends connected one to the real line and one to the artificial line of the duplex, said voltage divider having two additional taps, the first one of which is located a predetermined electrical distance from the main line connection to the divider, and the second one of which is located twice that electrical distance from the artificial line end of the voltage divider, a pair of electron tubes each having an input circuit and an output circuit, the input circuit of one of said tubes including that portion of the voltage divider between said first and said second mentioned taps, the input circuit of the second electron tube including that portion of the voltage divider between the first mentioned tap and the artificial line end of the voltage divider, indicating means in the output circuit of each of said electron tubes, said means being operable only upon the application thereto of a certain minimum voltage, means to adjust the output of one of said tubes to cause both said indicating means to function upon the application of a particular voltage to the corresponding electron tube input circuit, said means comprising an adjustable potentiometer common to the output circuits of both said electron tubes, means to connect said voltage divider to said duplex circuit, and means to simultaneously adjust the outputs of said tubes over a range including the pre-set operating point for said indicating means whereby said indicators are caused one to operate when the artificial line resistance is too low and the other to operate when the artificial line resistance is too high.

8. In a device for indicating the comparative magnitudes of peak voltages derived from the real and artificial lines of the duplex telegraph circuit and thereby indicating the condition of balance between the said real and artificial lines, in combination a voltage divider having a center tap and adapted to have said center tap connected to the split of the duplex and its ends connected one to the real line and one to the artificial line of the duplex, said voltage divider having two additional taps, the first one of which is located a predetermined electrical distance from the main line connection to the divider, and the second one of which is located twice that electrical distance from the artificial line end of the voltage divider, a pair of electron tubes each having an input circuit and an output circuit, the input circuit of one of said tubes including that portion of the voltage divider between said first and said second mentioned taps, the input circuit of the second electron tube including that portion of the voltage divider between the first mentioned tap and the artificial line end of the voltage divider, indicating means in the output circuit of each of said electron tubes, said means being operable only upon the application thereto of a certain minimum voltage, means to adjust the output of one of said tubes to cause both said indicating means to function upon the application of a particular voltage to the corresponding electron tube input circuit, said means comprising an adjustable potentiometer common to the output circuits of both said electron tubes, means to connect said voltage divider to said duplex circuit, and means comprising a potentiometer common to the input circuits of both said tubes to simultaneously adjust the outputs of said tubes over a range including the pre-set operating point for said indicating means whereby said indicators are caused one to operate when the artificial line resistance is too low and the other to operate when the artificial line resistance is too high.

9. In a device for indicating the comparative magnitudes of peak voltages derived from the real and artificial lines of the duplex telegraph circuit and thereby indicating the condition of balance between the said real and artificial lines, in combination a voltage divider having a center tap and adapted to have said center tap connected to the split of the duplex and its ends connected one to the real line and one to the artificial line of the duplex, said voltage divider having two additional taps, the first one of which is located a predetermined electrical distance from the main line connection to the divider, and the second one of which is located twice that electrical distance from the artificial line end of the voltage divider, a pair of electron tubes each having an input circuit and an output circuit, the input circuit of one of said tubes including that portion of the voltage divider between said first and said second mentioned taps, the input circuit of the second electron tube including that portion of the voltage divider between the first mentioned tap and the artificial line end of the voltage divider, each output circuit comprising a glow tube which ignites upon the application of a definite minimum voltage thereto, means to adjust the output of one of said tubes to cause said glow tubes to function upon the application of a particular voltage to the corresponding electron tube input circuit, means to connect said voltage divider to said duplex circuit, and means to simultaneously adjust the outputs of said tubes over a range including the pre-set operating point for said glow tubes whereby said indicators are caused one to operate when the artificial line resistance is too low and the other to operate when the artificial line resistance is too high.

10. In a device for indicating the comparative magnitudes of peak voltages derived from the real and artificial lines of the duplex telegraph circuit and thereby indicating the condition of balance between the said real and artificial lines, in combination a voltage divider having a center tap and adapted to have said center tap connected to the split of the duplex and its ends connected one to the real line and one to the artificial line of the duplex, said voltage divider having two additional taps, the first one of which is located a predetermined electrical distance from the main line connection to the divider, and the second one of which is located twice that electrical distance from the artificial line end of the voltage divider, a pair of electron tubes each having an input circuit and an output circuit, the input circuit of one of said tubes including that porton of the voltage divider between said first and second mentioned taps, the input circuit of the second electron tube including that portion of the voltage divider between the first mentioned tap and the artificial line end of the voltage divider, each output circuit comprising a glow tube which ignites upon the application of a definite minimum voltage thereto, means to adjust the output of one of said tubes to cause said glow tubes to function upon the application of a particular voltage to the corresponding electron tube input circuit, said means comprising an adjustable potentiometer common to the output circuits of both said electron tubes, means to connect said voltage divider to said duplex circuit, and means to simultaneously adjust the outputs of said tubes over a range including the pre-set operating point for said glow tubes whereby said indicators are caused one to operate when the artificial line resistance is too low and the other to operate when the artificial line resistance is too high.

11. In a device for indicating the comparative magnitudes of peak voltages derived from the real and artificial lines of the duplex telegraph circuit and thereby indicating the condition of balance between the said real and artificial lines, in combination, a voltage divider having a center tap and adapted to have said center tap connected to the split of the duplex and its ends connected one to the real line and one to the artificial line of the duplex, said voltage divider having two additional taps, the first one of which is located a predetermined electrical distance from the main line connection to the divider, and the second one of which is located twice that electrical distance from the artificial line end of the voltage divider, a pair of electron tubes each having an input circuit and an output circuit, the input circuit of one of said tubes including that portion of the voltage divider between said first and said second mentioned taps, the input circuit of the second electron tube including that portion of the voltage divider between the first mentioned tap and the artificial line end of the voltage divider, each output circuit comprising a glow tube which ignites upon the application of a definite minimum voltage thereto, means to adjust the output of one of said tubes to cause said glow tubes to function upon the application of a particular voltage to the corresponding electron tube input circuit, means to connect said voltage divider to said duplex circuit, means comprising a potentiometer common to the input circuits of both of said tubes to simultaneously adjust the outputs of said tubes over a range including the pre-set operating point for said glow tubes whereby said indicators are caused one to operate when the artificial line resistance is too low and the other to operate when the artiflicial line resistance is too high.

HARRY C. LIKEL.